US009069740B2

(12) United States Patent
Taudes et al.

(10) Patent No.: US 9,069,740 B2
(45) Date of Patent: Jun. 30, 2015

(54) COMPUTER IMPLEMENTED METHOD FOR TRANSFORMATION BETWEEN DISCUSSION DOCUMENTS AND ONLINE DISCUSSION FORUMS (75) Inventors: Alfred Taudes, Vienna (AT); Hannes Leo, Bisamberg (AT)

(73) Assignee: COMMUNITY-BASED INNOVATION SYSTEMS GMBH, Bisamberg (AT)

( * ) Notice: Subject to any disclaimer, the term of this patent is extended or adjusted under 35 U.S.C. 154(b) by 413 days.

(21) Appl. No.: 13/554,786

(22) Filed: Jul. 20, 2012

(65) Prior Publication Data
US 2014/0026042 A1 Jan. 23, 2014

(51) Int. Cl.
G06F 17/22 (2006.01)
G06F 17/24 (2006.01)
G06Q 10/10 (2012.01)

(52) U.S. Cl.
CPC ............ *G06F 17/24* (2013.01); *G06F 17/2229* (2013.01); *G06F 17/2241* (2013.01); *G06Q 10/101* (2013.01)

(58) Field of Classification Search
USPC .......................................... 715/256, 249, 523
See application file for complete search history.

(56) References Cited

U.S. PATENT DOCUMENTS

| 7,107,550 | B2 * | 9/2006 | Newman ........................ 715/853 |
| 7,111,253 | B2 * | 9/2006 | Newman ........................ 715/854 |
| 7,814,048 | B2 * | 10/2010 | Zhou et al. ...................... 707/602 |
| 2003/0187664 | A1 * | 10/2003 | Bonebrake ......................... 705/1 |
| 2003/0189592 | A1 * | 10/2003 | Boresjo ........................... 345/751 |
| 2004/0093558 | A1 * | 5/2004 | Weaver .......................... 715/500 |
| 2005/0131916 | A1 * | 6/2005 | Banatwala et al. ............ 707/100 |
| 2006/0004776 | A1 | 1/2006 | Ohashi |
| 2006/0101328 | A1 | 5/2006 | Albornoz et al. |
| 2007/0061703 | A1 | 3/2007 | Kambhatla et al. |
| 2008/0046394 | A1 * | 2/2008 | Zhou et al. ....................... 706/52 |
| 2008/0208820 | A1 * | 8/2008 | Usey et al. ......................... 707/3 |
| 2008/0243877 | A1 * | 10/2008 | Kipp et al. ..................... 707/100 |
| 2009/0094537 | A1 * | 4/2009 | Alber ............................. 715/758 |
| 2010/0142715 | A1 * | 6/2010 | Goldstein et al. ............... 381/56 |
| 2010/0185733 | A1 * | 7/2010 | Hon et al. ...................... 709/205 |
| 2010/0217804 | A1 * | 8/2010 | Carrer et al. .................. 709/206 |
| 2012/0131103 | A1 * | 5/2012 | Fox ............................... 709/204 |
| 2012/0259752 | A1 * | 10/2012 | Agee ............................... 705/35 |
| 2013/0159414 | A1 * | 6/2013 | Zhou ............................. 709/204 |
| 2013/0246907 | A1 * | 9/2013 | Uhlig et al. ................... 715/234 |
| 2013/0311906 | A1 * | 11/2013 | Mackin ........................ 715/758 |

OTHER PUBLICATIONS

Droscher et al.; phpBB 3.0 Olympus Documentation; 2005; phpBB Group; pp. 1-136.*

* cited by examiner

*Primary Examiner* — Andrew Dyer
(74) *Attorney, Agent, or Firm* — Christie, Parker & Hale, LLP (57) ABSTRACT Method for transformation between a discussion document and an online discussion forum including: dividing the discussion document into several portions, according to original headings contained in the discussion document and for each of the plurality of portions, creating a sub-forum of the online discussion forum, in a forum database, the description of which being a text of a respective heading; creating a topic for each paragraph and sub-heading of lower hierarchy; inserting a text of each paragraph into a discussion database, formatted according to rules of the online discussion forum; modifying the online discussion forum via a discussion forum software; creating a new version of the discussion document including the original headings; parsing the adapted online discussion forum starting with a first sub-forum; inserting titles of lower level sub-forums in the new version of the discussion document as sub-headings; and outputs the new version of the discussion document.

15 Claims, 5 Drawing Sheets

FIG. 1

*Theme 1*

Sub-theme 1.1
This is the first argument.
This is the second argument containing a link: http://www.google.at/

Sub-theme 1.2
- Item 1
- Item 2

*Theme 2*

Sub-theme 2.1

| 1 | 2 |
|---|---|
| 3 | 3 |

1. sub-forums = get_elements_by_tag("hn")
2. j=0
3. for i = 1 to sub-forums.length
4.    INSERT INTO SUB-FORUM(i, forum_description(sub-forums[i]), sub-forums[i])
5.    next_node = sibling(sub-forums[i])
6.    while next_node.tag <> "hn"
7.      if next_node.tag < "hn"
8.        INSERT INTO TOPIC(j, i, topic_description (next_node), next_node)
9.      else {
10.        j=j+1
11.        INSERT INTO TOPIC (j, i, topic_description (j), "")
12.        INSERT INTO POST(1, j, i, 0, post_content(next_node), next_node,user, today, 0) }
13.      next_node=sibling(next_node) }
14. end

FIG. 4

1. copy and modify header information from original discussion document 2. body_node = get_elements_by_tag("body")

3. for i = 1 to COUNT(SELECT * FROM SUB-FORUM)

4.     SELECT ORIGINAL_FORMAT FROM SUB-FORUM WHERE SUB-FORUM_ID = i 5.     If i=1 new_node = child(ORIGINAL_FORMAT, body_node)

6.     else new_node=sibling(ORIGINAL_FORMAT, new_node)

7.     for j = 1 to COUNT(SELECT * FROM TOPIC WHERE SUB-FORUM_ID = i)

8.         SELECT ORIGINAL_FORMAT FROM TOPIC WHERE TOPIC_ID = j AND SUB-FORUM_ID = i 9.         if ORIGINAL_FORMAT <> " "

10.           new_node=sibling(ORIGINAL_FORMAT, new_node)

11.         else {

12.           RECURSIVE SELECT * FROM POST WHERE TOPIC_ID = j AND SUB-FORUM_ID = i 13.           for each element in the resulting table:

14.             new_node= sibling(document_paragraph(IN_REPLY_ID, CONTENT, ORIGINAL_FORMAT, AUTHOR, DATE, VOTES), new_node) }

15.     end 16. end

FIG. 5

*Theme 1*

Sub-theme 1.1

This is the first argument. Votes: 2 positive, 1 negative
Comment by user1 on 1/1/2012: I agree Votes: 1 negative
   Reply by user 2 on 2/1/2012: I disagree
Comment by user 3 on 3/1/2012: This argument is too short
This is the second argument containing a link: http://www.google.at/ Votes: 3 positive

Sub-theme 1.2
- Item 1
- Item 2

Comment by user 1 on 1/1/2012: Item 3 is missing
   Reply by user 2 on 2/1/2012: Yes, this item is missing
      Reply by user 3 on 3/1/2012: No, 3 is not necessary

*Theme 2*

Sub-theme 2.1

| 1 | 2 |
|---|---|
| 3 | 3 |

COMPUTER IMPLEMENTED METHOD FOR TRANSFORMATION BETWEEN DISCUSSION DOCUMENTS AND ONLINE DISCUSSION FORUMS

FIELD OF INVENTION

The present invention relates generally to the field of electronic collaboration, and more particularly to a computer implemented method for transformation between discussion documents and online discussion forums.

BACKGROUND

Explicit knowledge relevant for larger communities is usually contained in documents. Therefore knowledge dissemination and refinement in larger organizations, communities and societies are often done via the discussion of documents. Usually, a first version of a document is created by an individual or a small group and subsequently handed over to a larger group of relevant people for discussion and feedback. Traditionally, this process has been organized via costly face-to-face meetings or by distributing copies of the discussion document and collecting feedbacks on paper. In the latter case, a discussant can only see the original document and his or her comments, but cannot react to feedback given by others. Therefore, several time-consuming rounds of commenting and/or proponent intervention are necessary for the resolution of ambivalent or conflicting feedback.

Computer-based methods for discussing electronic documents provide all participants with an electronic version of the document and the possibility to insert comments (annotations) electronically at any position. Compared to paper-based discussions these systems have the advantage that all participants can see the current status of the discussion, and can immediately react to feedback given by others so that face-to-face meetings can be simulated even for large groups at low cost.

SUMMARY

In some embodiments, the present invention is a computer implemented method for transformation between a (electronic) discussion document and an online discussion forum. The method includes: electronically dividing the discussion document into several portions, according to original headings contained in the discussion document and for each of the plurality of portions, creating a sub-forum of the online discussion forum, in a forum database, the description of which being a text of a respective heading. The method further includes electronically creating a topic for each paragraph and sub-heading of lower hierarchy in a respective sub-forum of the online discussion forum; inserting a text of said each paragraph into a discussion database as an opening post of a respective topic, formatted according to rules of the online discussion forum; and modifying the online discussion forum via a discussion forum software. The discussants are then invited to the online discussion forum to make comment on the ideas formulated in the paragraphs by inserting posts. The method then creates a new version of the discussion document including the original headings; parses the adapted online discussion forum starting with a first sub-forum; inserts titles of lower level sub-forums in the new version of the discussion document as sub-headings, and the inserted posts are inserted in the same ordering as they appear in the online forum discussion indicating whether a post is a comment to an original paragraph or a comment to a comment; and outputs the new version of the discussion document.

In some embodiments, the discussion document is electronically represented as a document tree where structure and formatting of the discussion document is determined by tagged element nodes and the text of the discussion document is contained in text nodes that are children of element nodes. The tags indicate headings at various user-defined levels and different ways of formatting the paragraphs that contain the text. In some embodiments, the discussion database includes a sub-forum table, and a topic table and a post table for each sub-forum.

BRIEF DESCRIPTION OF THE DRAWINGS

Appendix A shows an internal representation of the discussion document of FIG. 1 in HTML format, the entire contents of which is expressly incorporated by reference herein.

Appendix B shows an exemplary online discussion database after completion of the first transformation, according to some embodiments of the present invention, the entire contents of which is expressly incorporated by reference herein.

DETAIL DESCRIPTION

Many discussion documents have a particular structure. They lay down a number of ideas (arguments, thoughts, propositions etc.) and group them hierarchically into themes and sub-themes. Typical examples of such discussion documents are legislative texts, policy and strategy papers or organizational designs. Usually, the themes and sub-themes are formatted as (sub-) headings, and the ideas (arguments, thoughts, propositions etc.) as paragraphs containing text, links, tables, lists or images. In this case, a natural insertion point for comments is the end of a paragraph and the document headings provide additional structure to the discussion.

The present invention makes use of this special structure of a discussion document to develop two transformation methods between discussion documents and online (written) discussions that are executed by one or more computers and/or electronic devices. The first method transforms a discussion document into an online discussion forum. Here, the document headings at a user-specified level are transformed into sub-forums of the online discussion, and each paragraph is transformed into a topic (thread), in which its opening post is the content of the respective paragraph. On this basis, standard discussion forum software can be used by the discussants to comment on the discussion document through the usual (online) posting method and to vote on the paragraphs and other posts. After the end of the discussion, the second transformation method is employed to transform the results of the online discussion back into a new version of the discussion document, where the posts submitted are placed after the respective paragraph and formatted according to their point of reference (the paragraph or another post). In some embodiments, the present invention is a combination of the above two transformation methods between discussion documents and online discussions. In other words, the second transformation method constructs a revised discussion document from the database of the online discussion forum.

Through these transformations, an electronic annotation process can be realized with generally available document processing and discussion forum software. Specialized document annotation software is not needed and costs can be saved. In particular, the discussants do not have to learn to use a new and unfamiliar type of software, but can participate in document refinement using the familiar format of a traditional online discussion forum.

Figure 1:
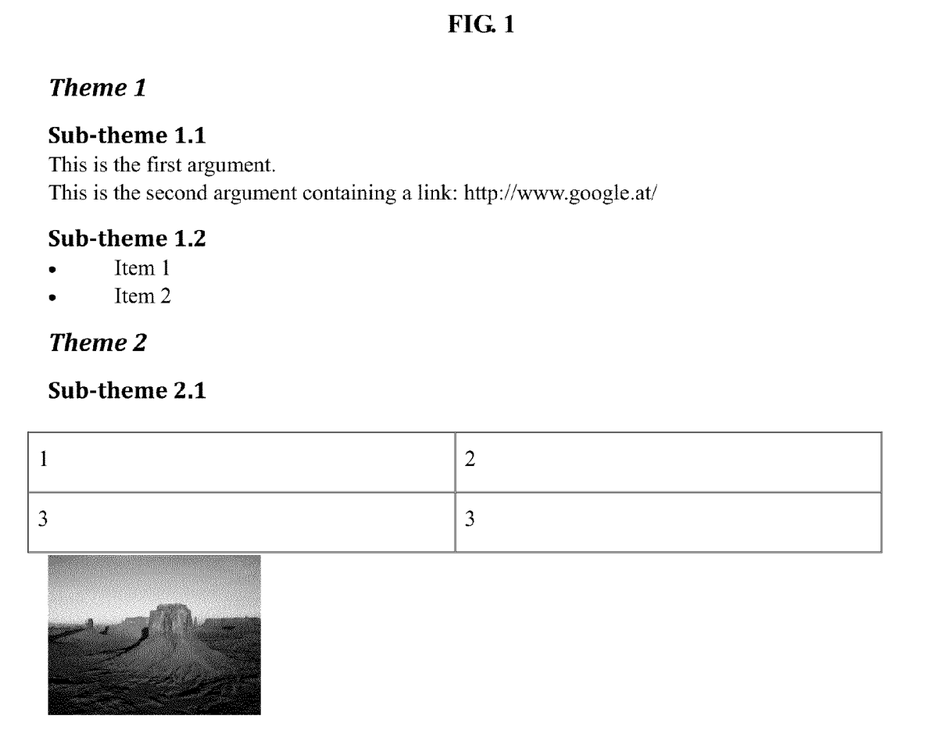
FIG. 1 depicts an exemplary discussion document, according to some embodiments of the present invention.

FIG. 1 depicts an exemplary discussion document, according to some embodiments of the present invention. As shown, the exemplary document includes two themes (Theme 1 and Theme 2). Theme 1 contains two sub-themes, Sub-theme 1.1 and Sub-theme 1.2, and Theme 2 contains Sub-theme 2.1. Sub-theme 1.1. includes two paragraphs and Sub-theme 1.2 contains an itemization as paragraph. Sub-theme 2.1. contains a table and a graphic as paragraphs.

Figure 2:
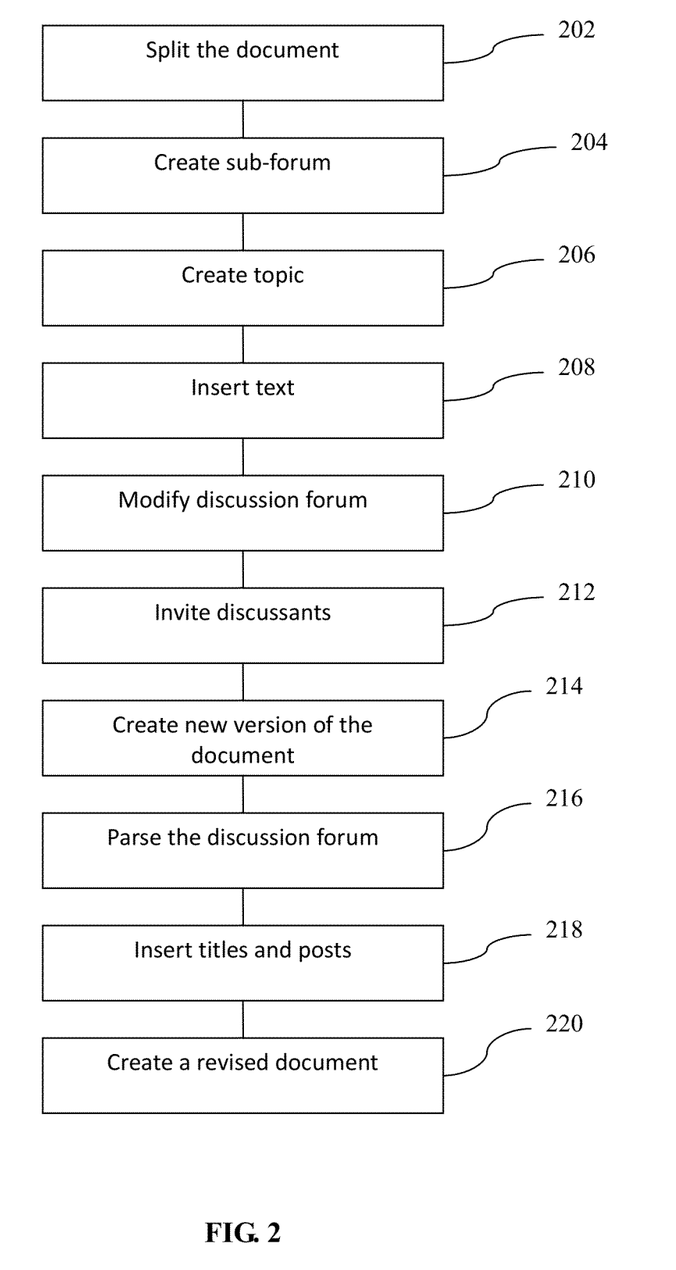
FIG. 2 illustrates an exemplary process flow, implemented by one or more computers, according to some embodiments of the present invention.

FIG. 2 illustrates an exemplary process flow, implemented by one or more computers, according to some embodiments of the present invention. As shown in block 202 (in the first transformation method), the discussion document is split (divided) into parts according to the headings at a user-specified hierarchical level. In the exemplary document shown in FIG. 1, the document can be split into two parts according to the themes Theme 1 and 2, or into three parts according to the sub-themes Sub-theme 1.1, Sub-theme 1.2, and Sub-theme 2.1. In block 204, for each part a sub-forum is created in the forum database, the description of which being the text of the respective heading. In some embodiments of the invention, additional levels of headings above these headings can be introduced as higher level sub-forums. For instance, if one chooses to split the exemplary document depicted in FIG. 1 according to the sub-themes, there would be three sub-forums and one could introduce Theme 1 as higher-level sub-forum for sub-forums Sub-Theme 1.1. and Sub-Theme 1.2 and Theme 2 as higher-level sub-forum for sub-forum 2.1. In block 206, a topic (thread) is created for each paragraph in the respective sub-forum of the online discussion forum, and in block 208, the text of the paragraph is inserted into the forum database, as the opening post of the respective thread. If the formatting rules of the document processing system that is used for composing the discussion document differ from those of the online discussion forum software used for discussing it, the format of the entries into the forum database is transformed and the original format is stored. For instance, if the discussion document is stored in HTML format and the forum software uses BBCode, document entry <H2 CLASS="western">Theme 1</H2> would be transformed into [b] Theme 1 [\b].

Sub-headings of lower hierarchy contained in a part of the document are entered into the database as topics for which posts and votes are not allowed. After its creation, the online discussion forum can be modified via a discussion forum software, as shown in block 210. For instance, an additional sub-forum that allows discussions that are not directly related to a paragraph can be added or voting and commenting on threads that resemble to paragraphs that do not describe ideas (arguments, thoughts, propositions etc.) can be disabled.

Then, the discussants are invited to the forum and invited to make comment on the ideas (arguments, thoughts, propositions etc.) formulated in the different paragraphs by inserting their posts after the initial posts, or as replies to posts of other discussants, in block 212. This can be done, for example via an electronic mail that contains the purpose of the discussion, its time line and a link to the online discussion forum. Additionally, the discussants can vote on the original paragraph (opening post) and on posts of other discussants. After its closing, the online discussion can be transformed into a new version of the discussion document via the second transformation method. In the second transformation and in block 214, a new version of the discussion document is created by copying the original header information, and the (modified) online discussion forum is parsed starting with a first sub-forum, in block 216. In block 218, titles of lower level sub-forums are inserted as sub-headings, and the posts are inserted into the document in the same ordering as they appear in the forum discussion, where the formatting indicates the respective reference, i.e., whether the post is a comment to the original paragraph or a comment to a comment. Accordingly, the final output is a revised version of the discussion document that contains the comments and votes provided by the discussants.

A discussion document is represented as a document tree, where the structure and formatting is determined by tagged element nodes and the text is contained in text nodes that are children of element nodes. An example of such a representation is the Document Object Model for HTML and XML-documents, as defined by the World Wide Web Consortium. The present invention uses tags indicating headings at various levels and tags that indicate different ways of formatting the paragraphs that contain the ideas (arguments, thoughts, propositions etc.). In HTML, for instance, a heading at level n is indicated by tag <hn>, a paragraph by tag <p>, and a link by tag <a>. The tags used to define tables are <table> and <td>, lists are formatted via the tags <ul>, <ol>, and <li> and <img> are used for images. <header> and <body> are parent nodes for the header and body sub-tree of the discussion document.

It is noted that generic representations of the discussion document and the database of the online discussion forum are used for simplification to describe the transformation methods. However, the scope of the present invention is not limited by said generic representations.

Appendix A shows the HTML document tree that resembles the exemplary discussion document depicted in FIG. 1, when the above-described tags are used.

In some embodiments, for the database of the online discussion the invention uses the following exemplary database schema:

---

SUB-FORUM (SUB-FORUM_ID, DESCRIPTION, ORIGINAL_FORMAT)
TOPIC (TOPIC_ID, SUB-FORUM_ID, DESCRIPTION, ORIGINAL_FORMAT)
POST (POST_ID, TOPIC_ID, SUB-FORUM_ID, IN_REPLY_ID, CONTENT, ORIGINAL_FORMAT, AUTHOR, DATE, VOTES)

---

Clearly, any other table structure and column naming that describe an analogous semantic can also serve as the basis for the methods of the present invention. For instance, one can also implement the above-described functionality in a content management system, employing different node types to model the structure of a discussion forum.

A SUB-FORUM table contains the sub-forums of the online discussion forum. SUB-FORUM_ID contains the number of the sub-forum (unique key) and DESCRIPTION contains its description. This is taken from the text of the heading that was transformed into the sub-forum. ORIGINAL_FORMAT contains the heading of the discussion document in its original format. This is used to correctly transform the online discussion back to a revised discussion document. In a standard online discussion forum, software fields for comments or other additional fields can be used for this purpose. In some embodiments, the SUB-FORUM table can be hierarchically structured, for instance, by adding a column PARENT_ID that contains the SUB-FORUM_ID of the sub-forum to which the respective sub-forum belongs.

A TOPIC table contains the topics (threads). TOPIC_ID is the number of the respective topic within the forum with id SUB-FORUM_ID. The column DESCRIPTION can contain the consecutive number of the paragraph that contains the idea (argument, thought, proposition etc.), or the text of a sub-heading with a level below the level used for defining the sub-forums. In this case, ORIGINAL_FORMAT contains the original heading, otherwise, it is left blank.

A POST table collects the posts belonging to a topic. POST_ID is the number of the post within the topic TOPIC_ID within the sub-forum with key SUB-FORUM_ID. The content of the post is stored in CONTENT. AUTHOR contains the author and DATE the date of the post. The votes are stored in fields VOTES. IN_REPLY_ID is the key of the post to which the post is a reply. Posts that directly reference the original paragraph point to the opening post. Such a post has POST_ID 1, IN_REPLY_ID 0, the user executing the transformation as AUTHOR and the date of the transformation as DATE. CONTENT contains the transformation of the content of the paragraph according to the rules of the respective forum software and ORIGINAL_FORMAT the original paragraph. In some embodiments, these tables are filled on the basis of a document tree representation with the procedure depicted in FIG. 3.

Figure 3:
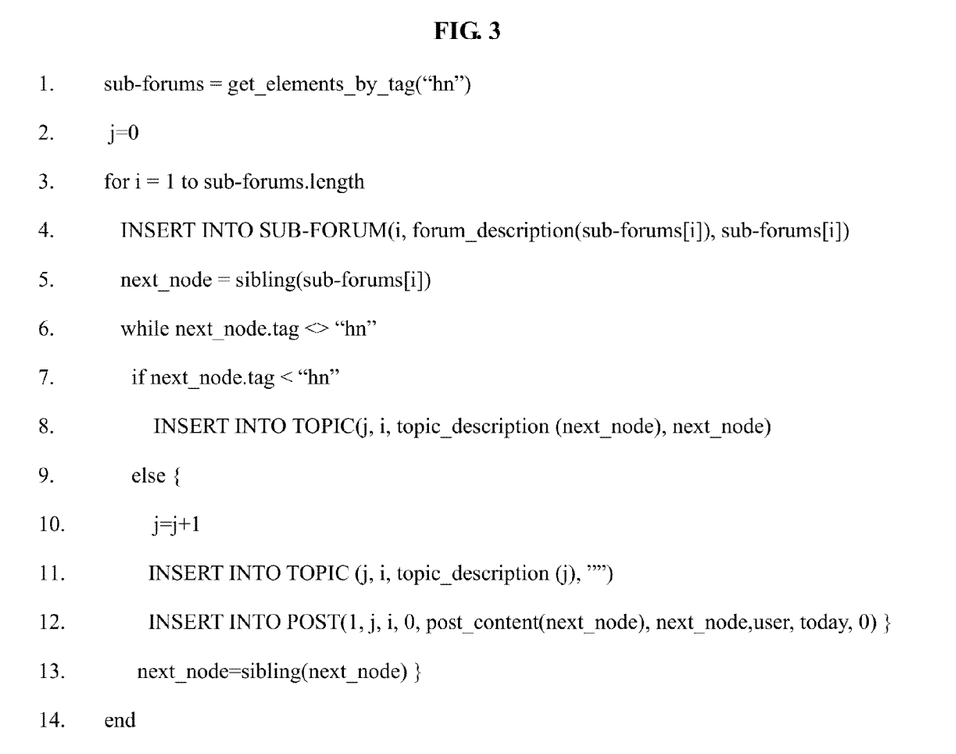
FIG. 3 is an exemplary process flow (including pseudo code) of a first transformation method, according to some embodiments of the present invention.

FIG. 3 is an exemplary process flow (including pseudo code) of a first transformation method, according to some embodiments of the present invention. Let n be the level of hierarchy that has been specified by the user to define sub-forums. Then the discussion document is split up into parts headed by headings with tag "hn". These headings are retrieved in line 1 of the procedure (pseudo code) into the array sub-forums via the method get_elements_by_tag("hn") supplied by the respective document object model. The length of this array is returned by method sub-forums.length, i.e., number of sub-forums generated resembles sub-forums.length. In line 2, the number of paragraphs (topics) is initialized, that is, j=0.

The generated sub-parts of the discussion document are traversed in the loop defined from lines 3 to 14. In line 4, a row is inserted into the SUB-FORUM table. The unique key SUB-FORUM_ID is given by the counter of the loop. The description of the sub-forum is constructed via the function forum_description that generates an entry conforming to the standard of the forum from the i-th element in sub-forums. For instance, if the forum software uses BBCode, the entry <H2 CLASS="western">Theme 1</H2> in the example of Appendix A could be transformed into [b] Theme 1 [\b]. The original element node together with the text is stored in column ORIGINAL_FORMAT. In the above example, this is <H2 CLASS="western">Theme 1</H2>.

Then, the part of the document following the i-th heading is traversed in lines 5 to 13. In line 5, the neighboring element node of the sub-heading is determined via function sibling (sub-forums[i]).

In line 6, it is checked whether the next sub-heading with hierarchy n is encountered. In this case, the inner loop is terminated and the traversal of the next part of the discussion document is started.

In line 7, the invention checks whether the element node is a sub-heading with a hierarchy below n. If this is the case, only a row in the TOPIC table is inserted. This is shown in line 8. Here, the TOPIC_ID is entered as the counter of the topic and i as the number of the sub-forum to which the topic belongs is entered. In an analogy to the headings from which the sub-forums are created, the description of the topic is constructed via the function topic_description that generates an entry conforming to the standard of the forum from the respective element node. The respective next_node is stored in column ORIGINAL_FORMAT.

Lines 10 to 12 deal with the case of a paragraph. In line 11, a row is inserted into the TOPIC table, again with the keys j and i. Now, the CONTENT is generated via the formatting of the counter of the topic j with the function topic_description, an ORIGINAL_FORMAT is not needed as only the posts are transformed back so that this column is left blank.

In line 12, the paragraph is stored as the first post of the topic generated. Thus, its number is 1, with j and i as the respective foreign keys. The content of the post is constructed via the function post_content that generates an entry conforming to the standard of the forum from the paragraph next_node. For instance, if the forum software uses BBCode the list entry

```
<UL>
    <LI><P LANG="en-US" STYLE="margin-bottom:
    0.35 cm">Item 1</P>
    <LI><P LANG="en-US" STYLE="margin-bottom:
    0.35 cm">Item 2</P>
</UL>,
``` in the example of FIG. 2, could be transformed into [list] [*] Item 1 [*] Item 2 [list].

The element node next_node together with its sub-tree is stored in column ORIGINAL_FORMAT. The user executing the transformation is taken as the AUTHOR and the date of the execution as DATE. The column VOTING is initialized with 0. Then, the inner loop proceeds with the next neighbor, as shown in line 13. In other words, the first transformation method fills the forum database from the content of a discussion document.

Appendix B shows the contents of an exemplary online discussion database after applying the above procedure to the example given in FIG. 1 and Appendix A.

Figure 4:
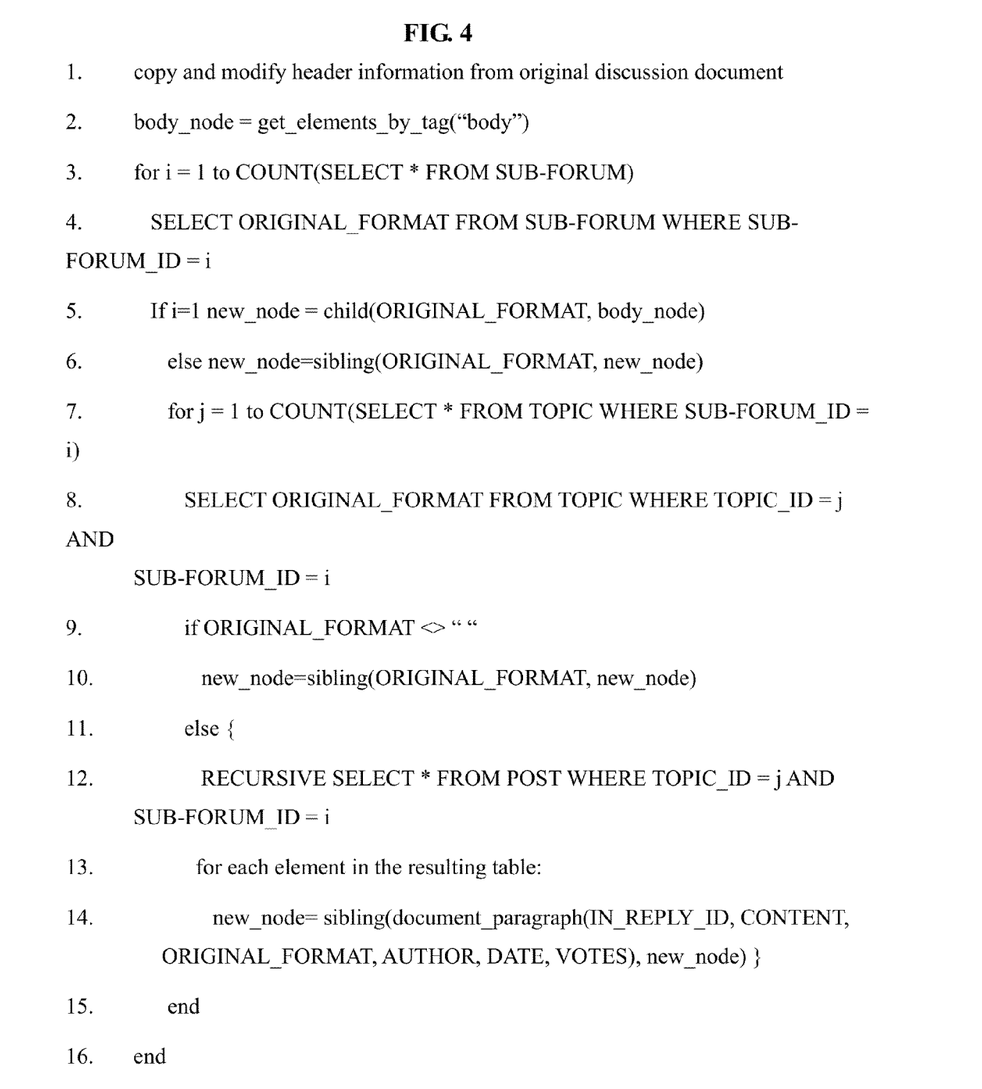
FIG. 4 depicts an exemplary process flow of a second transformation method, according to some embodiments of the present invention.

FIG. 4 depicts an exemplary process flow of a second transformation method, according to some embodiments of the present invention. As shown in the first line, the header sub-tree of the original discussion document is copied and modified (e.g. by changing the title of the document). Then, the rows of the discussion database are inserted into the document as children of the body element node, which is retrieved in line 2. Subsequently, the SUB-FORUM table is traversed and the next entry in the column ORIGINAL_FORMAT is added to the document as child of body_node (line 5) or as neighbor of the last node added (line 6).

Then, the topics belonging to the respective sub-forum are retrieved in lines 7 and 8. The content of ORIGINAL_FORMAT is entered as new_node in line 10, if it is not blank. Otherwise, the posts belonging to the topic are entered.

In line 12, a recursive select is performed on the posts, where the posts are connected via the content of the IN_RE- PLY_ID field. In line 14, the posts are traversed in this hierarchy and the element nodes and sub-trees are assembled from the columns and the content of the post via function document_paragraph.

In the case of an initial post, i.e., a paragraph of the original discussion document, the content of ORIGINAL_FORMAT can be taken for this purpose. For posts that were supplied by the discussants, the formatting are derived either from paragraphs with the same tagging or from default format rules.

Figure 5:
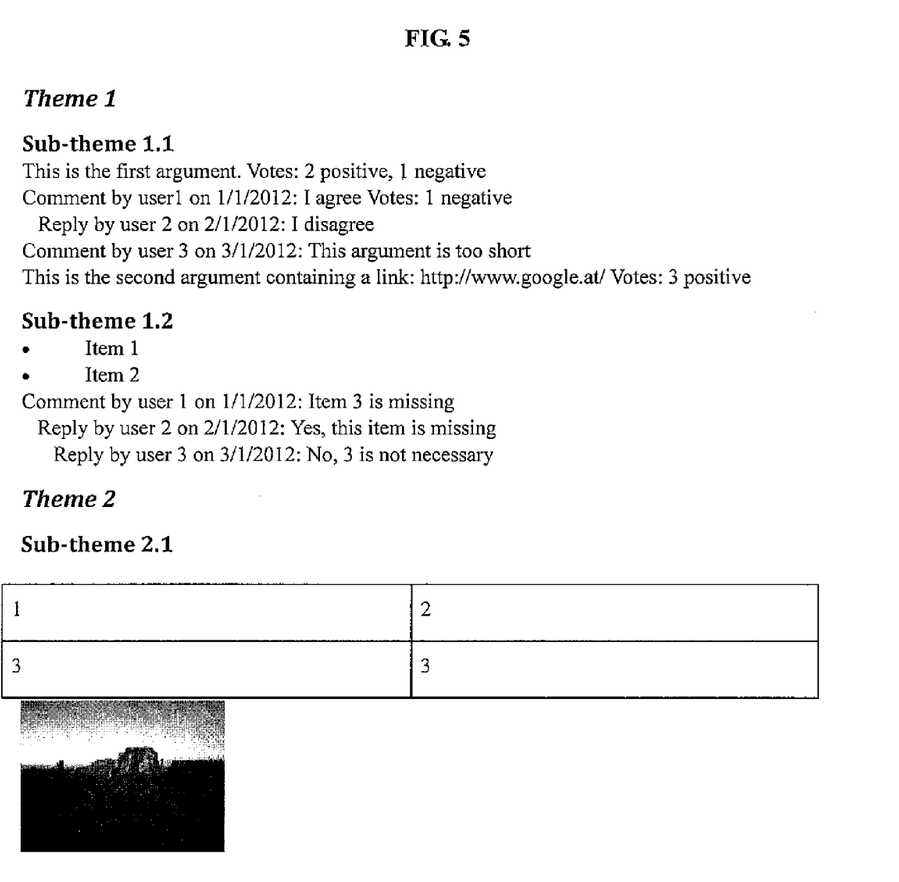
FIG. 5 shows an exemplary revised exemplary discussion document resulting from the application of the second transformation method, according to some embodiments of the present invention.

FIG. 5 shows a revised discussion document that results when the above procedure is applied to the database depicted in Appendix B, with some additional comments (posts) added. In particular, the first paragraph in Theme 1 is commented by user 1 and user 3, and user 2 replied to the comment given by user 1. As shown, this paragraph has also received three votes: two positive ones and one negative. Also, the itemization in Sub-theme 1.2 was commented. User 1 commented that item 3 is missing. In reply, user 2 agreed while responding to this post, and user 3 stated that 3 is not necessary.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

APPENDIX A

Example discussion document in HTML

```
<!DOCTYPE HTML PUBLIC "-//W3C//DTD HTML 4.0 Transitional//EN">
<HTML>
<HEAD>
  .....
</HEAD>
<BODY LANG="de-AT" DIR="LTR">
<H1 CLASS="western">Example Discussion Document</H1>
<H2 CLASS="western">Theme 1</H2>
<H3 CLASS="western">Sub-theme 1.1</H3>
<P LANG="en-US" STYLE="margin-bottom: 0.35cm">This is the first argument.</P>
<P STYLE="margin-bottom: 0.35cm"><SPAN LANG="en-US">This is the second argument containing
a link: </SPAN><FONT COLOR="#0000ff"><U><A HREF="http://www.google.at/"
TARGET="_top"><SPAN LANG="en-US">http://www.google.at/</SPAN></A></U></FONT></P>
<H3 CLASS="western">Sub-theme 1.2</H3>
<UL>
    <LI><P LANG="en-US" STYLE="margin-bottom: 0.35cm">Item 1</P>
    <LI><P LANG="en-US" STYLE="margin-bottom: 0.35cm">Item 2</P>
</UL>
<H2 CLASS="western">Theme 2</H2>
<H3 CLASS="western">Sub-theme 2.1</H3>
<P LANG="en-US" STYLE="margin-bottom: 0.35cm"><BR><BR>
</P>
<TABLE WIDTH=614 BORDER=1 BORDERCOLOR="#000000" CELLPADDING=7
CELLSPACING=0>
    <COL WIDTH=292>
    <COL WIDTH=292>
    <TR VALIGN=TOP>
        <TD WIDTH=292>
            <P LANG="en-US">1</P>
        </TD>
        <TD WIDTH=292>
            <P LANG="en-US">2</P>
        </TD>
    </TR>
    <TR VALIGN=TOP>
        <TD WIDTH=292>
            <P LANG="en-US">3</P>
        </TD>
        <TD WIDTH=292>
            <P LANG="en-US">3</P>
        </TD>
    </TR>
</TABLE>
<P LANG="en-US" STYLE="margin-bottom: 0.35cm"><BR><BR>
</P>
<P STYLE="margin-bottom: 0.35cm"><IMG
SRC="Example%20Discussion%20Document_html_m65069f3b.jpg" NAME="Grafik 1"
BORDER=0></P>
</BODY>
</HTML>
```

APPENDIX B

Content of the forum database for example discussion document

SUB-FORUM - user specified hierarchy level 2

| SUB-FORUM_ID | DESCRIPTION | ORIGINAL_FORMAT |
|---|---|---|
| 1 | Theme 1 | <H2 CLASS="western">Theme 1</H2> |
| 2 | Theme 2 | <H2 CLASS="western">Theme 2</H2> |

TOPIC

| TOPIC_ID | SUB-FORUM_ID | DESCRIPTION | ORIGINAL_FORMAT |
|---|---|---|---|
| 1 | 1 | Sub-theme 1.1 | <H3 CLASS="western">Sub-theme 1.1</H3> |
| 2 | 1 | 2 | |
| 3 | 1 | 3 | |
| 4 | 1 | Sub-theme 1.2 | <H3 CLASS="western">Sub-theme 1.2</H3> |
| 5 | 1 | 5 | |
| 1 | 2 | Sub-theme 2.1 | <H3 CLASS="western">Sub-theme 2.1</H3> |
| 2 | 2 | 2 | |
| 3 | 2 | 3 | |

POST

| POST_ID | TOPIC_ID | SUB-FORUM_ID | IN_REPLY_ID | CONTENT | ORIGINAL_FORMAT | AUTHOR | DATE | VOTES |
|---|---|---|---|---|---|---|---|---|
| 1 | 2 | 1 | 0 | This is the first argument | <P LANG="en-US" STYLE="margin-bottom: 0.35cm">This is the first argument.</P> | User | Today | 0 |
| 1 | 3 | 1 | 0 | This is the second argument containing a link: [url=http://www.google.at [/url] | <P STYLE="margin-bottom: 0.35cm"><SPAN LANG="en-US">This is the second argument containing a link: </SPAN><FONT COLOR="#0000ff"> <U><A HREF= "http://www.google.at/" TARGET="_top"><SPAN LANG="en-US">http://www.google.at/ </SPAN></A></U> </FONT></P> | User | Today | 0 |
| 1 | 5 | 1 | 0 | [list] [*]Item 1 [*]Item 2 [/list] | <UL> <LI><P LANG="en-US" STYLE="margin-bottom: 0.35cm">Item 1</P> <LI><P LANG="en-US" STYLE="margin-bottom: 0.35cm">Item 2</P> </UL> | User | Today | 0 |
| 1 | 2 | 2 | 0 | [table] [tr] [td]1 [/td] [td]2 [/td] [/tr] [tr] [td]3 [/td] [td]4 [/td] [/tr] [/table] | <TABLE WIDTH=614 BORDER=1 BORDERCOLOR="#000000" CELLPADDING=7 CELLSPACING=0> <COL WIDTH=292> <COL WIDTH=292> <TR VALIGN=TOP> <TD WIDTH=292> <P LANG="en-US">1</P> </TD> <TD WIDTH=292> <P | User | Today | 0 |

APPENDIX B-continued

Content of the forum database for example discussion document

| | | | | | | |
|---|---|---|---|---|---|---|
| | | | | | LANG="en-US">2</P><br></TD><br></TR><br><TR VALIGN=TOP><br><TD WIDTH=292><br><P LANG="en-US">3</P><br></TD><br><TD WIDTH=292><br><P LANG="en-US">3</P><br></TD><br></TR><br></TABLE> | |
| 1 | 2 | 2 | 0 | [img]Example-%20Discussion-%20Document__html__m65069f3b.-jpg[/img] | <P STYLE="margin-bottom: 0.35cm"><IMG SRC="Example%20-Discussion%20-Document__html__m65069f3b.-jpg" NAME="Grafik 1" BORDER=0></P> | User  Today  0 |

What is claimed is:

1. A computer implemented method for transformation between a discussion document and an online discussion forum, the method comprising:

dividing the discussion document into a plurality of portions, according to a plurality of original headings contained in the discussion document;

for each of the plurality of portions, creating a sub-forum of the online discussion forum, in a forum database, the description of which being a text of a respective heading;

creating a topic for each paragraph and sub-heading of lower hierarchy in a respective sub-forum of the online discussion forum;

inserting a text of said each paragraph into a discussion database as an opening post of a respective topic, wherein said discussion database includes a sub-forum table, and a topic table, and a post table for each sub-forum;

determining if a format of said text is different from a format of the online discussion forum, wherein if the format of said text is different from the format of the online discussion forum, formatting said text of said each paragraph according to rules of the online discussion forum;

modifying the online discussion forum via a discussion forum software;

inviting a plurality of discussants to the online discussion forum to make comment on the ideas formulated in the paragraphs by inserting posts;

creating a new version of the discussion document including the original headings, wherein said inserted posts are placed in the new version after a respective paragraph of said each paragraph and formatted, according to a point of reference of each post;

parsing the new version of the discussion document starting with a first sub-forum and proceeding to next sub-forums, one after another;

inserting titles of lower level sub-forums in the new version of the discussion document as sub-headings, and the inserted posts are inserted in the same ordering as they appear in the online forum discussion indicating whether a post is a comment to an original paragraph or a comment to a comment; and outputting the new version of the discussion document.

2. The method of claim 1, wherein the discussion document is electronically represented as a document tree where structure and formatting of the discussion document is determined by tagged element nodes and the text of the discussion document is contained in text nodes that are children of element nodes.

3. The method of claim 2, wherein said tags indicate headings at various user-defined levels and different ways of formatting the paragraphs that contain the text.

4. The method of claim 1, wherein said sub-forum table includes a description for each sub-forum that resembles a heading and said heading in its original format.

5. The method of claim 4, wherein said sub-forum table further includes a SUB-FORUM_ID column containing a unique ID for each sub-forum, a DESCRIPTION column containing description for each sub-forum taken from the text of the heading that was transformed into the sub-forum, an ORIGINAL_FORMAT column containing the heading of the discussion document in its original format to correctly transform the online discussion back to a revised discussion document, a PARENT_ID column containing the SUB-FORUM_ID the sub-forum to which a respective sub-forum belongs.

6. The method of claim 1, wherein said topic table includes a sub-heading or a consecutive number of the paragraph that has been transformed into a topic.

7. The method of claim 6, wherein said topic table further includes a TOPIC_ID column for the ID of a respective topic within the discussion forum having a SUB-FORUM_ID column, and an ORIGINAL_FORMAT column containing the original heading, if there is one.

8. The method of claim 1, wherein said post table includes a plurality of votes, respective dates and respective authors of the votes.

9. The method of claim 1, wherein said parsing the adapted online discussion forum comprises:
- traversing all topics belonging to a respective sub-forum;
- if a respective format of a respective sub-heading is not blank, appending the respective sub-heading to the discussion document;
- otherwise, hierarchically traversing all posts belonging to a respective topic, so that an original paragraph and all the posts to the original paragraph are added to the discussion document with author, data and voting information.

10. The method of claim 3, wherein said tags determine the way in which the nodes of the document tree are stored in the discussion database.

11. The method of claim 1, wherein a node with a header tag <hn> is stored as sub-forum, the method further comprising:
- starting with each node with a header tag <hn>, inspecting a next node in the document tree;
- if the next node is a node with a header tag of lower priority it is stored as topic; and
- otherwise, the next node is stored as a topic and the topic's first post.

12. The method of claim 1, wherein the content of the document is stored in a format compatible with the discussion forum software and in its original format so as to ensure a proper re-transformation to a revised document.

13. The method of claim 1, wherein said new version of the document is created by copying and modifying the header information from the original document and inserting relevant components of the discussion database.

14. The method of claim 13, wherein the first sub-forum is inserted into the new version of the document as a first header node of the content part of the document.

15. A computer implemented method for transformation between a discussion document and an online discussion forum, the method comprising:
- dividing the discussion document into a plurality of portions, according to a plurality of original headings contained in the discussion document;
- for each of the plurality of portions, creating a sub-forum of the online discussion forum, in a forum database, the description of which being a text of a respective heading;
- creating a topic for each paragraph and sub-heading of lower hierarchy in a respective sub-forum of the online discussion forum;
- inserting a text of said each paragraph into a discussion database as an opening post of a respective topic, formatted according to rules of the online discussion forum, wherein said discussion database includes a sub-forum table, and a topic table and a post table for each sub-forum;
- modifying the online discussion forum via a discussion forum software;
- inviting a plurality of discussants to the online discussion forum to make comment on the ideas formulated in the paragraphs by inserting posts;
- creating a new version of the discussion document including the original headings;
- parsing the adapted online discussion forum starting with a first sub-forum;
- inserting titles of lower level sub-forums in the new version of the discussion document as sub-headings, and the inserted posts are inserted in the same ordering as they appear in the online forum discussion indicating whether a post is a comment to an original paragraph or a comment to a comment; and
- outputting the new version of the discussion document, wherein said post table includes a plurality of votes, respective dates, respective authors of the votes, a POST_ID column for the ID of a given post within a topic TOPIC_ID column and within a sub-forum with a key of SUB-FORUM_ID, a CONTENT column for storing the content of the given post, an AUTHOR column containing the author of the given post, a DATE column for the date of the given post, a VOTES column for storing the votes, an IN_REPLY_ID column as the key of a post to which the given post is a reply, and an ORIGINAL_FORMAT column containing the original paragraph.

* * * * *